United States Patent Office 3,375,200
Patented Mar. 26, 1968

3,375,200
COOLING WATER TREATMENT AND COMPOSITIONS USEFUL THEREIN
Reed S. Robertson, Glen Ellyn, Ill., assignor to Nalco Chemical Company, Chicago, Ill., a corporation of Delaware
No Drawing. Continuation-in-part of application Ser. No. 266,193, Mar. 19, 1963. This application Aug. 17, 1965, Ser. No. 480,523
2 Claims. (Cl. 252—181)

The present application is a continuation-in-part of application Ser. No. 266,193 which was filed on Mar. 19, 1963, now abandoned.

The invention is directed to a process for the treatment of cooling water to make the water less corrosive and to minimize the fouling of metal heat exchange surfaces caused by the deposition of alumina floc and other materials carried in suspension in the water. More particularly, the subject invention relates to cooling water compositions which contain both phosphates and modified tannins.

River water is usually relatively low in hardness and high in turbidity. This turbidity may consist of suspended clay and other forms of suspended silt, microbiological growths, iron and other suspended solids. Turbid water, whether it be river water or water from some other source, usually is clarified with alum and/or sodium aluminate before it is used as the recirculating cooling liquid in cooling systems. The commonly used clarification plant settling beds are somewhat inefficient and the settled solids, which include alumina floc, are easily disturbed by current and thermal gradients. Some of the precipitated alumina floc and other solids often are carried over into the make-up water for recirculating cooling systems. The total concentration of alumina floc and solids and this water may be only a few parts per million but, circulating in the system, they tend to agglomerate into larger particles and stick on surfaces of the cooling system, such as cooling tower decks, and especially on heat transfer surfaces. Also, the particles of alumina floc include and absorb other suspended matter, such as microbiological growths, corrosion products, silt, and the like. Over a period of time these suspended solids in the recirculating cooling water build up a voluminous, flocculent deposit which can severely reduce heat transfer coefficients and impede water flow through heat exchangers. Although the deposit is very light in density, it adheres tightly to hot metal surfaces and is not readily removed by simply increasing the water velocity through heat exchanger tubes during normal operations. It is accordingly a need in the field of water treatment to provide a combination of compatible chemicals in the cooling water which will keep suspended alumina floc in the cooling water and simultaneously minimize corrosion of the metal heat transfer surfaces and other component metal parts of the cooling system.

In general, it has been found that the corrosion and fouling of metal heat transfer surfaces coming in contact with cooling water can be controlled through the use of a composition containing both phosphates and modified tannins. The phosphates and modified tannins can be added to a cooling water separately, or they may be combined into a single product in either granular or powdered form or in the form of a shaped article of manufacture, e.g., a water treating ball. One of the advantages of the subject compositions is that they can be formed readily into compact balls which can be added conveniently to the cooling water.

The phosphates which can be used in the water treating compositions of the subject invention include the following: orthophosphates, pyrophosphates such as tetrasodium pyrophosphate, tripolyphosphates such as sodium tripolyphosphate, any of the water-soluble polyphosphate glasses or so-called molecularly dehydrated phosphates of any of the alkali metals, alkaline earth metals, zinc, or cadmium including those known as hexametaphosphates and glassy septaphosphates. The use of phosphates in cooling water systems is described in a patent to Fink et al., U.S. 2,358,222.

The modified tannins can be produced from all types of natural tannins. Mixtures of tannins may also be used in preparing the subject compositions. The color reactions of tannins are used in their identification and classification. The tannins have been divided into two principal groups—the catechol tannins and the pyrogallol tannins. After dry distillation the catechol tannins yield catechol as a principal product of decomposition, and the pyrogallol tannins after dry distillation yield pyrogallol. Solutions containing catechol give a greenish-black precipitate with ferric salts, whereas solutions containing pyrogallol tannins give a bluish-black precipitate with ferric salts. In general, only pyrocatechol derivatives are found in catechol tannins, whereas gallic acid is always present in pyrogallol tannins. The preferred tannins for use in the subject process are the catechol tannins although pyrogallol tannins can also be used in the process.

Natural tannins can be obtained from a number of materials. One of the principal sources in the quebracho trees, the wood of which contains about 20 to 23% of easily extractable tannin of the catechol type. Other sources include chestnut wood, divi-divi pods, mangrove bark cutch (one of the preferred sources along with quebracho trees), wattle bark, gallnuts, hemlock bark, sumac, and oak bark.

A discussion of tannins and tannin chemistry is set forth in the Encyclopedia of Chemical Technology, vol. 13, pages 578 to 599, which article is included as part of the subject disclosure.

In the modification step the tannins are reacted with an aqueous solution of a salt of sulfurous acid of the group consisting of the salts of ammonium, potassium and sodium sulfite and bisulfite, or are modified by reaction with sodium or ammonium cyanides, with sodium chloroacetate, with sulfuric acid (either sulfonation or oxidation), with nitric acid (which would involve either oxidation or nitration), etc., to product functional group changes in the natural tannin whereby its performance is markedly improved as an aid to the phosphate treatment.

A preferred group of modified tannins which can be used in the subject invention is described in U.S. Patent 2,831,022. In the process disclosed in this patent Western hemlock bark or barks of like chemical characteristics are digested at elevated temperatures in the presence of suitable amounts of aqueous ammonium, sodium, or potassium sulfite or bisulfite or mixtures of these silutions until compositions composed of extracts and derivatives are formed from the naturally occurring tannins contained in the bark. Pieces of bark are desirably reduced in size to pass screens of about 4 to 20 meshes to the inch prior to the digestion step. The digestion temperature can range from about 50° C. to about 200° C. Digestions which are both rapid and relatively efficient are obtained at temperatures of from about 75° C. to about 165° C. According to Patent No. 2,831,022 digestion periods of about 0.5 hour to about 4.0 hours can be used, but in all cases digestions are stopped while there still remains some content of sulfurous acid salt in the charge. It is also pointed out in the patent that a smaller proportion of the alkali sulfurous acid salt than that equivalent to about 0.01 part of sulfur dioxide per part of oven dry bark is insufficient, while more salt than that equivalent to about 0.30 part sulfur dioxide per part of oven dry bark is in excess of that needed to carry out the reaction satisfactorily. It is likewise pointed out, however, that an excess of the latter proportion can be used provided inorganic salts resulting from such excessive amounts are not deleterious in the solutions of water-soluble products derived from the process. The disclosure of U.S. Patent 2,831,022 is included in the subject specification by reference. In the instant process tannins from sources other than hemlock bark which are modified as described in U.S. Patent 2,831,022 also can be used with great success.

The ratio of phosphates to modified tannins should be in the range of from about 1:4 to 4:1 in the final composition. The composition preferably is applied to water in sufficient quantities to give a phosphate concentration of from 1 to 100 p.p.m. express as $PO_4$. The preferred pH range of application is 6.5±0.5, although a pH of from 5.5 to 7.5 may still be used with satisfactory results.

Other materials may be added to a phosphate-modified tannin in order to increase the performance of the composition under special circumstances. Where copper or nickel alloys come in contact with the cooling water, for example, 2-mercaptobenzothiazole may be added to improve the performance. The use of these additional materials, however, is not considered a part of the subject invention. Various anionic inhibitors such as the well known chromates can also be added to the composition.

The exact nature of the activity of the combined modified tannins and phosphates on mild steel and Admiralty test specimens in a variety of waters is not fully known. It is known, however, that hardness in water plays an important part in the corrosion protection of mild steel with phosphate-based treatments. It is believed that precisely the right amount if calcium is needed to transport the condensed phosphate ions through the diffuse double layer to sites whereat dissolution of iron is taking place. The escaping iron at relatively high concentration at the surface catalyzes the hydrolysis of the condensed phosphate exposing reactive orthophosphate groups in close proximity to the metal surface. The freshly formed orthophosphate is chemisorbed onto the developing cubic oxides, controlling oxide form and rate of growth. The resulting protective film, which is largely iron oxides, has small amounts of both calcium and orthophosphate trapped in a thin outer layer. This outer layer is believed by some to be a calcium iron phisphate compound.

If the ratio of calcium ions to potential orthophosphate ions in solution or in double layer is too high then the condensed phosphate polyion may become blocked by counterions to the extent that the phosphate is no longer able to function in the above manner. This may be due to retarded hydrolysis rates at the metal surface or reduced activity of the released orthophosphate in the presence of the increased calcium concentration. Reaction rates here apparently are extremely important. It has been found that the proper balance can be restored in cases of high calcium content through the use of the modified tannins which are described above. These materials act as organic dispersing agents which, because they are anionic polyelectrolytes of the proper molecular weight and configuration, are capable of competing for counterions as well as adsorbing on nuclei and colloidal particles, particularly hydroxides, which might otherwise inactivate the phosphate. The phosphate must be able to make a close approach to the metal surface in an active form.

Almost all natural tannins react with iron and become inactive. The modified tannins used in the subject process, however, have a much lower susceptibility to iron-inactivation.

Phosphates also react with iron. Hydroxides such as iron or aluminum hydroxide absorb phosphate ions from solution increasing sludging, scaling and fouling. The modified tannins absorb on the colloidal hydrous oxides and prevent the depletion of the phosphates.

The type of phosphate used in the modified tannin composition seems to play a part in the degree of corrosion protection obtained. Orthophosphate is believed to be the active form, but if added as such it is quickly inactivated before it can reach the surface in sufficient quantity to be truly effective. Pyrophosphate, the dimer of orthophosphate, is a very effective inhibitor when combined with the modified tannins. Its higher degree of effectiveness stems from the fact that one mol on hydrolysis immediately gives two mols of orthophosphate. Further, its comparatively small size, even with any undissociated counterions, allows fairly rapid transport. The more highly condensed phosphates do not have as high mobility as the pyro form, nor do they revert to orthophosphate as rapidly at the surface where needed. The more highly condensed phosphates have a greater tendency to complex iron in solution any may actually increase the corrosion rates observed.

In very hard water, a combination of phosphates may be best. In each case, however, it is helpful to have pyrophosphate in the blend. The pyrophosphate would provide the fast reactivity and mobility required, while the higher phosphate would provide the holding power.

The following examples will serve to illustrate the subject invention.

Example I

This example shows one method which can be used to modify tannins. In the method, 100 grams of mangrove tannin was dissolved in 150 ml. of distilled water. A second solution was formed by dissolving 16.6 grams of sodium chloroacetate in 50 ml. of distilled water. The second solution was added slowly to the first solution as the tannin was being heated. The mixture of the two solutions was agitated for one hour at a temperature slightly below boiling. During the mixing 10 ml. of a sodium hydroxide solution was added to maintain the pH of the mixture above 8. The final solution was diluted to 500 ml. with distilled water and subsequently was used in a cooling water test described below.

Example II

This example illustrates a second method which can be used to produce the modified tannins of the subject invention. In this method, 50 grams of chestnut tannin was mixed with 0.1 gram of $V_2O_5$, 0.5 ml. of ethyl silicate "40," and 1 ml. of distilled water. The chestnut tannin had previously passed through an ion exchange resin to remove cations. Twenty-five (25) ml. of concentrated sulfuric acid was added to the above mixture and the mixture was allowed to react in its own heat for 20 minutes. After 20 minutes, 275 ml. of distilled water was introduced into the reaction mixture. Initially a thick paste was formed which thinned as more water was added. Twenty-five (25) ml. of isopropanol was added to precipitate the reaction product. The precipitate on filtration gave a black-brown cake. The cake was solubilized in water by raising its pH to above 11 with caustic. The solution was diluted to 500 ml. with distilled water and this product was used in conjunction with phosphates in the treatment of cooling waters.

The tannins can be reacted with nitric acid in a manner similar to sulfuric acid. In both cases the reaction is a nitration or sulfonation and/or oxidation reaction. Likewise, the modification can be carried out through the use of sodium, potassium or ammonium syanide or sodium, potassium or ammonium thiocyanate in which case the modification procedure would be carried out in a manner similar to that shown above in connection with sodium chloroacetate. As a substitute for sodium chloroacetate one can use any sodium or potassium haloacetate, halopropionate or halobutyrate. The preferred halogens are chlorine, bromine and iodine. As has been indicated previously, the tannins can also be modified by the method shown in U.S. Patent 2,831,022. The sulfite or bisulfite modification shown in the patent constitutes the preferred modification process in the subject invention. In the bisulfite treatment, the reaction is carried out initially at a moderate pH (5–7) whereby the bisulfite addition takes place with the oxy ring structure being split to form additional —OH groups. The solubilizing of the product with caustic preferably is then carried out under sufficiently mild condition (pH of 8–9) so as not to cause the product to hydrolyze or to revert to its original condition. Potassium or ammonium sulfite or bisulfite can be substituted for sodium sulfite or bisulfite in the process. As was indicated above, any natural tannin may be substituted for the hemlock tannin of U.S. Patent 2,831,022. The preferred tannins, however, are the mangrove and/or quebracho tannins.

*Example III*

Example 1 of U.S. Patent 2,831,022 is reproduced here as showing a preferred method of producing modified tannin.

A batch of 14.1 lb. ground western hemlock (*Tsuga heterophylia*) bark (all of which passed a wire screen having openings 7/16 inch by 11/16 inch, equivalent to 6.0 lb. oven-dry bark) was mixed with 45.6 lb. water and 145.8 gm. sodium metabisulfite ($Na_2S_2O_5$). The latter (which contained 5.7% moisture) is equivalent to 150.2 gm. sodium bisulfite ($NaHSO_3$) which is just as suitable as, and can be used instead of, the metabisulfite in this example. The mixture was heated to 85° C. and digested at that temperature for 2 hours. A considerable amount of the sodium sulfite remained. The mixture resulting from this digestion was drained and the solids were washed by showering hot water on the solids retained on a filter screen. The drainings and washings were filtered. The filtered solution of reaction product was concentrated to 40% solids at an absolute pressure of 5 lbs. per sq. in. and subsequently spray dried, leaving a water-soluble solid which when ground to a powder was dark reddish brown. Analysis of the filtered solution showed a gross yield of solids of 14.4% of the weight of the oven-dry bark which comprised organic and inorganic material. The net yield of organic solids derived from the bark was 9.4% of the weight of the oven-dry bark. The inorganic unconsumed $SO_2$ was 13.4% of the solids in solution. The dry product had a methoxy content of 1.9%.

The net yield of organic solids is a measure of the bark material which goes into the product solution and is determined by the formula $$Y = \frac{S_t - S_i}{W} 100$$

where Y is the percent net yield, $S_t$ is the weight of the total solid content of the liquor, $S_i$ is the weight of inorganic salt employed in the process and W is the weight of oven-dry bark treated.

A higher yield of reaction product in a more concentrated solution was obtained by expressing the reaction product in a press, and separating the same from the pulpous bark residue under a pressure of about 200 lbs. per sq. in. A portion of the solubilized products of digestion are included in the bark residue, but nevertheless being water soluble are readily removed from the bark on forcing out the occluded solution as in the expressing operation.

*Example IV*

In order to determine the effectiveness of the subject phosphate-modified tannin composition a series of tests were conducted using steel heat transfer tubes and coupons and using various test waters. The flow rate in all of the tests was 2.0 g.p.m. (gallons per minute). The tests were run at a pH of 6.0 to 6.5 and at a temperature of 125° F. unless otherwise needed. The tests were run for 14 days—four days at high treatment dosages and ten days at maintenance dosage. A complete description of the test procedure is set forth in Materials Protection, vol. 1, pages 23 to 30, October 1962. In the tests the following waters were used:

No. 1—400 p.p.m. hardness $CaCO_3$
No. 3—138 p.p.m. hardness $CaCO_3 + Al_2O_3$, $SiO_2$ and Fe The formulations used in the tests include the following:

| Formulation | Component | P.p.m. |
|---|---|---|
| No. 1 | Calcium lignosulfonate | 40.0 |
| | Sodium tripolyphosphate | 25.8 |
| | 2-mercaptobenzothiazole | 2.0 |
| | | 67.8 |
| No. 2 | Rayflo* (a bisulfited tannin produced by the method set out in Example III) | 20.0 |
| | Tetrasodium pyrophosphate | 28.0 |
| | 50% sodium 2-mercaptobenzothiazole | 8.0 |
| | Zinc sulfate monohydrate | 5.6 |
| | | 61.6 |
| No. 3 | Sodium lignosulfonate | 20.0 |
| | Tetrasodium pyrophosphate | 28.0 |
| | 50% sodium 2-mercaptobenzothiazole | 8.0 |
| | Zinc sulfate monohydrate | 5.6 |
| | | 61.6 |
| No. 4 | Rayflo* (a bisulfited tannin produced by the method set out in Example III) | 20.0 |
| | Tetrasodium pyrophosphate | 28.0 |
| | 2-mercaptobenzothiazole | 2.0 |
| | | 50.0 |

*This bisulfited tannin was dark reddish brown in color and was in the form of a free flowing powder. The chemical analysis of the material in percent by weight is as follows: Na, 9.0; K, 0.1; Ca, 0.3; Fe, 0.03; Cu, 0.002; Mn, 0.02; Methoxyl, 1.4; Phenolic hydroxyls, 7.8; Sugar, 0.0; Moisture, 4.0. pH of 1.0% aqueous solution, 8.2.

The results obtained using the subject formulations are set forth in the following table.

TABLE

| Formulation | Dosage, p.p.m. as $PO^4$ | | Water | Deposit, mg./cm.$^2$ | Corrosion, MPY |
|---|---|---|---|---|---|
| | Hi | Lo | | | |
| No. 1 | 60 | 10 | 1 | 3.2 | 1.5 | 14 |
| No. 1 | 30 | 10 | 1 | 45.5 | 103.0 | 8 |
| No. 2 | 60 | 10 | 1 | 2.2 | 0.9 | 14 |
| No. 2 | 30 | 10 | 1 | 2.5 | 1.4 | 14 |
| No. 3 | 60 | 10 | 1 | 4.9 | 1.8 | 14 |
| No. 1 | 60 | 20 | 3 | 14.1 | 9.9 | 14 |
| No. 4 | 60 | 20 | 3 | 3.2 | 0.7 | 14 |

As is apparent from the above table, Formulations 2 and 4 are much superior to Formulations 1 and 3. A comparison between Formulations 1 aand 2, for example, at a dosage level of 30 p.p.m. shows that the deposit in mg./cm.$^2$ is 45.5 for Formulation 1, whereas it is only 2.5 for Formulation 2. Using water No. 3, Formulation 1 at 60 p.p.m. level had a deposit in mg./cm.$^2$ of 14.1, whereas Formulation 4 at the same level using the same test water had a deposit of only 3.2 mg./cm.$^2$ during the same time period and under the same conditions.

The substitution of the products prepared as shown in Examples I and II for the modified tannin used in Example III produces comparable results. Where it is desired to have a tannin of increased molecular weight, it is possible to add formaldehyde along with the modifying agent. The formaldehyde undergoes a condensation reaction with the tannin which increases its average molecular weight from about 1,200 to 5,000 up to 30,000 or more.

As was pointed out above, the use of the combination of phosphates and modified tannins provides highly advantageous results in inhibiting corrosion and fouling of metal surfaces coming in contact with cooling waters. Modifying the tannin reduces its suceptibility to inactivation by iron. Furthermore, the modified tannin substantially prevents the depletion of phosphates which is caused by reaction with iron or aluminum hydroxide.

Obviously many modifications and variations of the invention as hereinbefore set forth may be made without departing from the spirit and scope thereof, and therefore only such limitations should be imposed as are indicated in the appended claims.

I claim:
1. A corrosion inhibiting composition for use in cooling waters which comprises in combinaton:
   (1) a bisulfited water dispersible tannin, said tannin having been disulfited by reaction with a material selected from the group consisting of ammonium bisulfite, sodium bisulfite, and potassium bisulfite at a temperature of from 50° C. to about 200° C. for from about 0.5 hour to about 4.0 hours, and
   (2) pyrophosphate, the ratio by weight of the materials being from about 1:4 to 4:1, said bisulfited water dispersible tannin having been condensed with formaldehyde.

2. A process for inhibiting the corrosive action of cooling waters which comprises: adding to said cooling waters (1) a bisulfited water dispersible tannin, said tannin having been bisulfited by reaction with a material selected from the group consisting of ammonium bisulfite, sodium bisulfite, and potassium bisulfite at a temperature of from 50° C. to about 200° C. for from about 0.5 hour to about 4.0 hours, and (2) pyrophosphate, the ratio by weight of the materials being from about 1:4 to 4:1, said pyrophosphate being added in sufficient quantity to provide a phosphate concentration of from 1 to 100 p.p.m. expressed as $PO_4$, said bisulfited tannin having been condensed with formaldehyde.

References Cited
UNITED STATES PATENTS

| | | | |
|---|---|---|---|
| 1,903,041 | 3/1933 | Hall et al. | 252—175 |
| 1,986,963 | 1/1935 | Evans et al. | 252—181 |
| 2,198,380 | 4/1940 | Ellis | 252—181 |
| 2,215,814 | 9/1940 | Hall | 252—85 |
| 2,358,222 | 9/1944 | Fink et al. | 252—175 |
| 2,831,022 | 4/1958 | Van Blaricom | 252—8.5 |
| 3,085,975 | 4/1963 | Jennings | 252—181 |

FOREIGN PATENTS 22,361  11/1914  Great Britain.

ALEXANDER H. BRODMERKEL, *Primary Examiner.*

L. B. HAYES, *Assistant Examiner.*

UNITED STATES PATENT OFFICE
CERTIFICATE OF CORRECTION

Patent No. 3,375,200                            March 26, 1968

Reed S. Robertson

It is certified that error appears in the above identified patent and that said Letters Patent are hereby corrected as shown below:

Column 2, lines 51 and 52, "silutions" should read -- solutions --. Column 4, line 16, "any" should read -- and --. Columns 5 and 6, in the last column of the second table, insert as a heading -- Days --; in the same table, sixth column, line 6 thereof, "9.9" should read -- 9.7 --.

Signed and sealed this 25th day of November 1969.

(SEAL)
Attest:

Edward M. Fletcher, Jr.                      WILLIAM E. SCHUYLER, JR.
Attesting Officer                                Commissioner of Patents